(12) United States Patent
Herrington et al.

(10) Patent No.: US 6,279,187 B1
(45) Date of Patent: Aug. 28, 2001

(54) SHELLFISH PREDATOR SCREEN CLEANER

(75) Inventors: Thomas O. Herrington, Elizabeth; Jan Nazalewicz, Mahwah; Gef Flimlin, Absecon, all of NJ (US)

(73) Assignees: Rutgers, The State University, New Brunswick; Trustees of Stevens Institute of Technology, Hoboken, both of NJ (US)

( * ) Notice: Subject to any disclaimer, the term of this patent is extended or adjusted under 35 U.S.C. 154(b) by 0 days.

(21) Appl. No.: 09/318,851

(22) Filed: May 26, 1999

Related U.S. Application Data
(60) Provisional application No. 60/087,760, filed on Jun. 2, 1998.

(51) Int. Cl.[7] .................. E04H 4/16; A47L 25/00
(52) U.S. Cl. ................. 15/1.7; 210/413; 119/264; 405/211; 15/88.4
(58) Field of Search .................. 15/1.7, 50.3, 52.1, 15/88.4, 246; 119/264; 405/211; 114/222; 210/159, 413

(56) References Cited

U.S. PATENT DOCUMENTS

| | | | | |
|---|---|---|---|---|
| 3,088,429 | * | 5/1963 | Johannessen | 114/222 |
| 3,114,922 | * | 12/1963 | Ballantyne | 15/50.3 |
| 3,950,809 | * | 4/1976 | Schatzmann | 15/1.7 |
| 4,030,440 | * | 6/1977 | Wickersham | 114/222 |
| 4,204,494 | * | 5/1980 | Bridwell | 114/222 |
| 4,236,477 | * | 12/1980 | Norris | 114/222 |
| 4,402,101 | * | 9/1983 | van Zyl | 15/1.7 |
| 5,074,004 | * | 12/1991 | Patton | 15/1.7 |

FOREIGN PATENT DOCUMENTS

| | | | | |
|---|---|---|---|---|
| 3581 | * | 5/1878 | (DE) | 114/222 |
| 2430494 | * | 3/1980 | (FR) | 15/1.7 |
| 214131 | * | 4/1924 | (GB) | 114/222 |
| 327959 | * | 4/1930 | (GB) | 114/222 |
| 2038721 | * | 7/1980 | (GB) | 114/222 |
| 0222390 | * | 11/1985 | (JP) | 114/222 |
| 0045295 | * | 2/1990 | (JP) | 114/222 |

* cited by examiner

*Primary Examiner*—Randall E. Chin
(74) *Attorney, Agent, or Firm*—Licata & Tyrrell P.C.

(57) ABSTRACT

A rotating brush assembly for cleaning shellfish predator screens is provided.

3 Claims, 2 Drawing Sheets

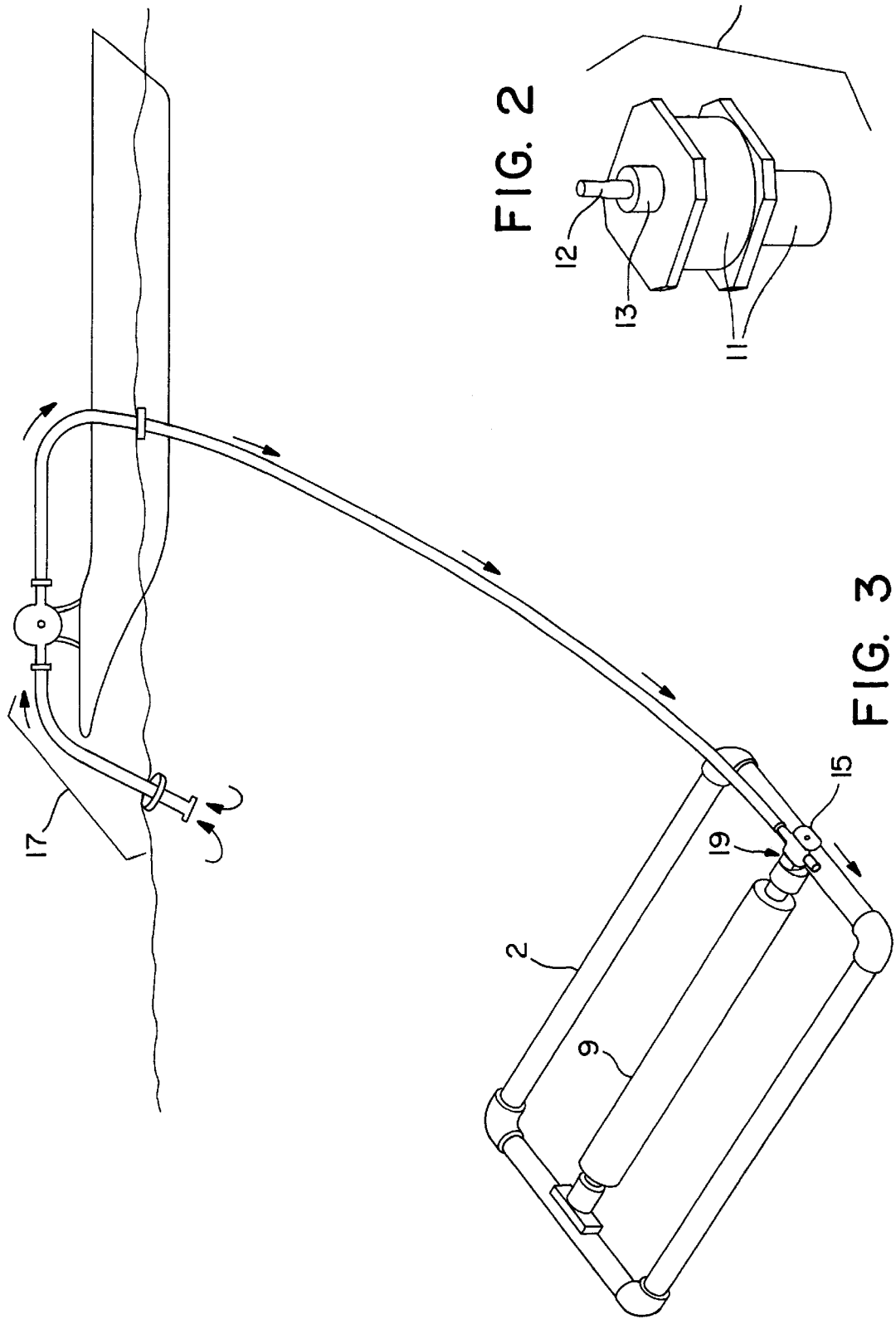

SHELLFISH PREDATOR SCREEN CLEANER

INTRODUCTION

This application claims the benefit of U.S. application Ser. No. 60/087,760, filed Jun. 2, 1998.

BACKGROUND OF THE INVENTION

Shellfish predator screens are composed of sheets of plastic mesh screening. The mesh screening has been utilized extensively by the hard clam (Mercenaria mercenaria) industry to prevent predation from fish and crustaceans. The screens are placed over juvenile shellfish beds and anchored in place by rebar and lead line. The anchors are pressed into the bottom sediments to the extent that the mesh rests immediately above the bottom. The protective screening remains in place until the clams grow beyond a size susceptible to predation. The mesh screening is successful in eliminating predation but quickly becomes fouled by a variety of indigenous seaweed species. Some seaweed species attach to the plastic mesh while others simply settle on top of the screen. The bio-fouling prevents the siphons of the juvenile clams from extending into the water column, causing the clams to suffocate.

Presently, the hard clamming industry reduces the amount of bio-fouling by manually scraping the top of the screens with a metal rod fitted with a loop of rebar at one end. The rebar is covered with PVC tubing or rubber garden hose to prevent against damage of the mesh screening. The screens are cleaned by a person operating from a small skif or wading in the water. The present cleaning technique is extremely labor intensive (one person can clean about six screens per hour) and can only be utilized during low tide. Typically, each screen must be cleaned every 10 to 14 days.

Accordingly, to increase the production efficiency of shellfish aquaculture, and in particular the hard clam industry, there is a need for more efficient techniques and/or devices to clean the protective mesh screens. Such techniques and/or devices should decrease the cleaning time per screen while at the same time reducing the amount of labor needed for cleaning. Additionally, it is desirable to employ a cleaning technique that can be utilized during any phase of the tide.

SUMMARY OF THE INVENTION

A mechanical rotating brush has now been developed to clean shellfish predator screens. The brush is designed to be pulled across the length of the screen by hand or by a small boat. As the brush is pulled along, the mechanical rotation of the brush allows the bristles to gently pull at the top of the mesh screening and remove any bio-fouling from the screen. The materials utilized to construct the rotating brush assembly are designed to resist corrosion and minimize maintenance.

DESCRIPTION OF THE DRAWING

FIG. 2 provides an outer view of the casing and drive motor assembly of the rotating brush assembly depicted in FIG. 1.

FIG. 3 provides a schematic of a shipboard pumping system which transfers seawater into the drive assembly to rotate the brush shaft and brush. The arrows depict water flow direction.

DETAILED DESCRIPTION OF THE INVENTION

Figure 1:
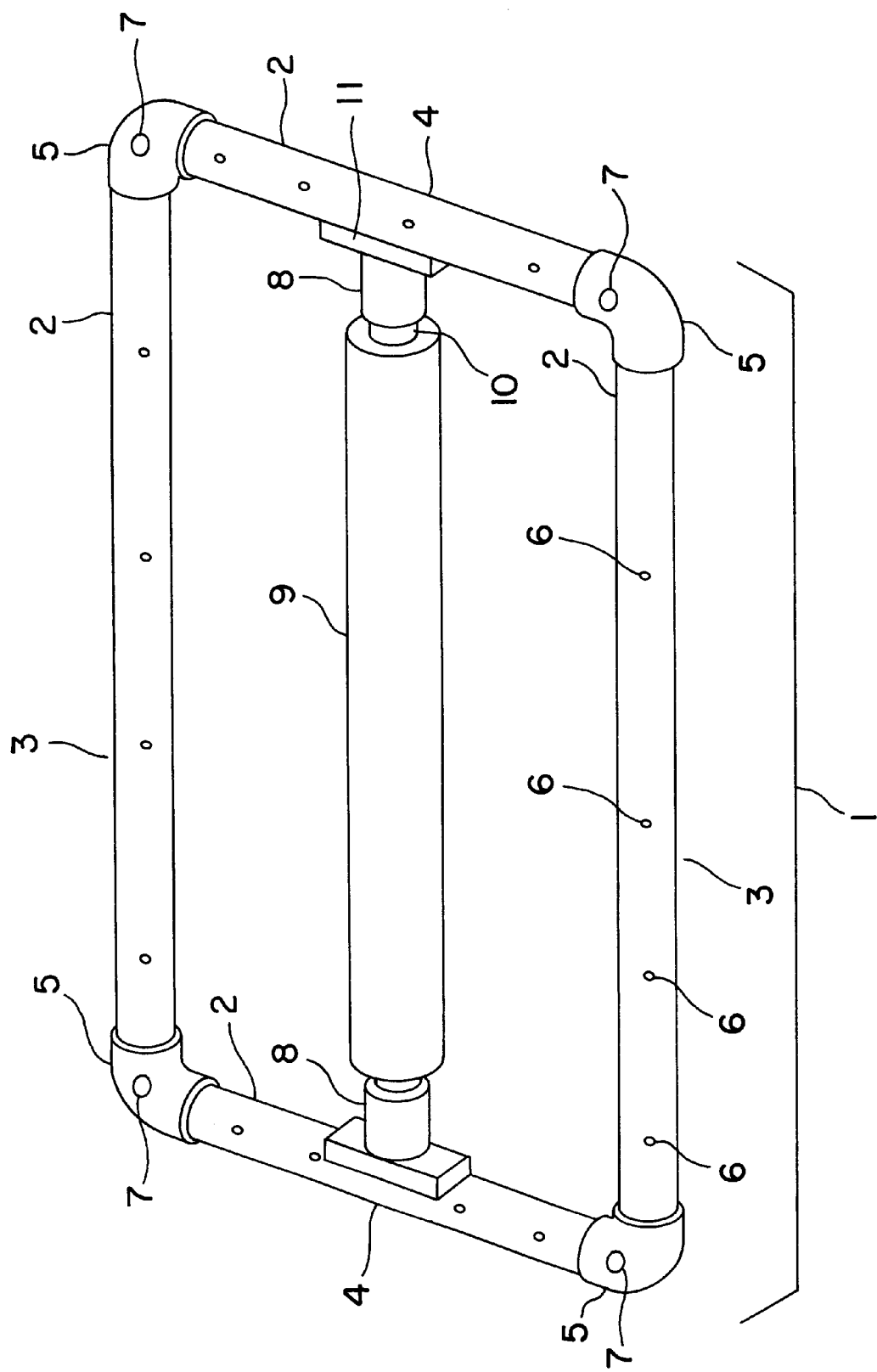
FIG. 1 provides a top view of one embodiment of a rotating brush assembly of the present invention.

The present invention relates to a rotating brush assembly for cleaning the protective mesh screens used in shellfish aquaculture. Use of this rotating brush assembly decreases both the time and labor required to clean these screens. Further, this assembly can be utilized during any phase of the tide.

In simplest form, the rotating brush assembly of the present invention is comprised of a brush and brush shaft rotatably mounted within a rectangular frame and a means affixed to the frame and/or brush shaft for rotating the brush shaft and brush. In one embodiment, the brush and brush shaft comprises a stainless steel shaft filled with a brush face. It is preferred that the bristles of the brush be crimped black nylon placed in a medium density wound configuration. The brush and brush shaft are rotated by a means suitable for rotation underwater. For example, in one embodiment, a motor, such as a 12 Volt DC permanent magnet, ball bearing, model 1L472 Dayton Gearmotor, fitted in a watertight PVC casing attached to one corner of the supporting frame is used. In this embodiment, a belt and gear assembly is utilized to transfer the shaft rotation to the brush. The motor is powered by a shipboard battery connected to the gear motor via a submarine quality power cable either threaded through a connecting rod or simply suspended in the water column. In another embodiment as shown in FIG. 3 the electric motor is replaced with a fluid driven gear assembly 15. In this embodiment, a shipboard pumping system 17 transfers seawater into the drive assembly 19 which rotates the brush shaft and brush 9. This configuration eliminates the need for a watertight housing attached to the PVC frame 2 and decreases the overall weight of the device.

The rectangular frame of the assembly preferably comprises a hollow PVC frame fitted with polystyrene foam for buoyancy. Ballasting weight is applied by allowing water to fill the remaining volume of the tubing unoccupied by foam. Means such as eyebolts fitted into the PVC frame are utilized as attachment points for a towing cable or an adjustable hollow aluminum connecting rod.

A top view of one embodiment of a rotating brush assembly 1 is depicted in FIG. 1. In this embodiment, the support frame 2 of the rotating brush assembly 1 is constructed of two 61 inch lengths 3 and two 30 inch lengths 4 of 3 inch diameter hollow PVC tubing joined together by four 4 ¼ inch diameter PVC elbow joints 5. The connections between the elbow joints 5 and the sections of tubing 3, 4 are preferably secured via stainless steel set screws. It is also preferred that both ends of each elbow joint be fitted with 4 ¼ inch diameter tapered collars. Each length of PVC tubing has multiple holes 6, preferably four ¼ inch diameter holes, drilled through the tubing for entry of water for ballasting. Means 7 for attaching a towing cable or connecting rod are also affixed to the rectangular frame 2 of the assembly 1. In one embodiment, as depicted in FIG. 1, this means 7 comprises 1 inch diameter eyebolts mounted on each PVC elbow joint 5 which are utilized as attachment points for a towing cable. PVC mounting block 8 for rotatably mounting the brush and brush shaft 9 are affixed to the center of the inside edges of two opposite lengths, either 3 or 4, of the frame 2. For example, as depicted in FIG. 1, PVC blocks with slots for placement of the brush and brush shaft 9 are attached to the center of the inside edges of the 30 inch long PVC tubes 4. In this embodiment, it is preferred that the blocks be 3 ⅝ inch long×3 inch diameter PVC blocks. The stainless steel shaft of the brush and brush shaft 9 is fitted into a 1 ⅛ inch diameter×3 inch deep round slot centered in each PVC block. A timing belt pulley 10 and a means 14 for rotating the brush shaft and brush 9 are, also affixed to the brush shaft of the brush shaft and brush and the frame 2 or PVC mounting block 8 for rotatably mounting the brush and brush shaft 9 to the frame 2. For example, as depicted in FIG. 1, a timing belt pulley 10, preferably comprising aluminum and being approximately 1 ¾ inch wide×3 inch in diameter, is set at one end of the stainless steel shaft located ½ inch from the inside edge of the PVC mounting block 8. A watertight motor casing 11 is mounted on the PVC mounting block 8 between the 30 inch long PVC tube 4 and the pulley 10. The drive motor assembly is mounted in the casing so that the drive shaft 12 is fitted through a ¾ diameter hole located on the inside face of the casing 11. See FIG. 2. The drive shaft hole is sealed with an O-ring. A second 1 ¾ inch wide×3 inch diameter aluminum timing belt pulley 13 is set on the drive shaft. See FIG. 2. A rubber timing belt is attached between the two pulleys and the entire assembly is held in place by a 8 inch×2 ½ inch×¾ inch PVC clamping block.

In this embodiment, power is supplied to the drive motor through a 50 foot long submarine quality power cable fitted through a 1 inch diameter hole in the outside face of the watertight casing. A metal clamping ring seals the cable access hole to ensure that a watertight seal is maintained. The power cable is fitted with 2 ½ inch wide×1 ¾ inch diameter plastic floatation cells to provide the cable with buoyancy. The opposite end of the power cable is attached to a 3 position toggle switch which can turn the motor on and off and reverse the polarity (rotation) of the brush. The toggle switch is attached to a 12 V DC battery power supply.

The rotating brush assembly of the present invention is designed to rest on top of the protective mesh screening and be pulled across the length of the screen by hand or by a small boat. The buoyancy of the brush assembly is pre-adjusted to ensure that the device is slightly negative immediately above the bottom. Buoyancy adjustment is achieved by filling the PVC tubing with water, foam and/or air. A slightly negative buoyancy ensures that, as the assembly is pulled across the screen, the PVC frame smooths out any irregularities in the screening and ensures that the brush bristles do not grab the screening. During each rotation of the brush, the bristles gently pull at the top of the mesh screening, grabbing any attached seaweed and removing it from the screen. In another embodiment, a manifold assembly located above the rotating brush is employed. Fluid flow would force the detached seaweed into and through the manifold. The fluid flow will discharge from one side of the manifold, transporting the detached seaweed away from the clam screen. This configuration decreases the probability of organism reattachment.

The materials utilized to construct the rotating brush assembly are chosen based on their ability to resist corrosion in the marine environment. It is preferred that the metal shafts, plates, fittings and securing hardware are made of stainless steel; the timing belt is made of rubber; and the pulleys are made of aluminum. It is preferred that the frame be constructed of PVC to eliminate the possibility of corrosion and biodegradation. It is preferred that the brush bristles are made of nylon to ensure maximum strength and resistance to abrasion. It is also preferred that all watertight seals are made of rubber and seated in milled grooves allowing the rubber to expand under compression to ensure a watertight seal. It is preferred that the power cable is enclosed in a marine grade rubber casing which provides a waterproof seal and ensures flexibility and resistance to bio-fouling.

The present invention is designed to be used for daily underwater predator screen cleaning operations. However, maintenance is required. The brush should be stored out of the water when not in use. The brush assembly should be rinsed with freshwater and the brush bristles should be cleaned with a comb or similar apparatus after each use. A drain plug in the motor housing allows the system to be checked for leaks. This should be done at regular intervals. If necessary, the rubber O-rings can be replaced by unbolting the casing, replacing the O-ring(s) and applying a thin coat of silicon gel.

The rotating brush of the present invention was tested in the hydrodynamic testing facilities. The testing facilities include a maneuvering and oblique-sea test basin measuring 75 feet long, 75 feet wide and 5 feet deep, and a high-speed towing tank measuring 313 feet long, 12 feet wide and 6 feet deep. The towing tank is equipped with a dual-flap programmable hydraulic wave-maker capable of generating regular and irregular waves up to 18 inches in height and 5 seconds in period. For coastal studies the towing tank is fitted with a 65 foot long sand beach with an offshore slope of 1 on 20. The prototype brush was tested in both tank facilities. The square basin was utilized to establish the proper buoyancy and determine the maneuvering characteristics of the brush assembly. The sand beach test section of the high-speed towing tank was utilized to determine the impact of the brush on the protective mesh screening.

A series of buoyancy tests in the maneuvering basin determined that, through a combination of polystyrene foam and water (ballast) inserted into the PVC frame of the brush-assembly, the buoyancy of the rotating brush can be precisely controlled. The buoyancy of the brush assembly was adjusted until the brush just touched the bottom of the tank without bending the nylon bristles. In this configuration, the frame of the rotating brush has a net positive buoyancy which provides enough lift force to negate all but a small amount of the weight of the motor and brush assembly. The net downward force is large enough to ensure the brush bristles remain in contact with the protective screening without producing a downward force on the seabed.

Once the proper buoyancy of the prototype brush had been established, the maneuverability of the brush was analyzed. Two ropes were attached via the eyebolts on one side of the PVC frame and the assembly lowered into the tank. The brush was turned on and the assembly allowed to move along the bottom of the tank. The rotation of the brush combined with the friction between the brush bristles and the tank bottom was found to be great enough to allow the brush to autonomously move along the bottom of the tank in a straight line. Stopping the brush and reversing the rotation of the brush with the toggle switch enabled the brush to return to its original position in the tank independently. The direction of motion of the brush assembly was easily adjusted by slightly pulling on one of the attached ropes. Chlorine dust on the bottom of the test tank was utilized as a tracer to determine the effectiveness of the brush as a cleaning device. The rotating brush was able to resuspend all of the chlorine dust in one pass across the bottom of the tank.

A test to determine the impact of the rotating brush on a bottom resting predator screen was conducted on the sand beach of the high-speed towing tank. A ¼ inch mesh predator screen was laid out on top of the sand from the still water line out to a water depth of 12 inches. The mesh was held in place with steel weights placed along the edges of the screening. The brush was placed at the seaward edge of the mesh screen, turned on and moved across the screen both up and down the beach slope. The brush assembly had to be pulled up the slope with the attached ropes but was able to autonomously move down the slope. Once the landward edge of the frame reached the still water line of the beach, the brush could no longer be moved up the slope of the beach. This is to be expected since the rotating brush is dependent on being neutrally buoyant to overcome the bottom friction. All of the tests were video taped by a VHS recorder. Visual observations indicated that the brush lightly touched the mesh screening but did not suspend any of the underlying sediment.

What is claimed is:

1. A rotating brush assembly for cleaning shellfish predator screens comprising:
    (a) a rectangular frame comprised of hollow PVC tubing, the inside of the hollow PVC tubing being fitted with polystyrene foam for buoyancy, said hollow PVC tubing containing multiple holes which allow water to fill the remaining volume of the tubing unoccupied by foam;
    (b) a brush and brush shaft rotatably mounted to the rectangular frame; and
    (c) a means for rotating the brush and brush shaft underwater affixed to the brush shaft and the rectangular frame.

2. The rotating brush assembly of claim 1 wherein the means for rotating the brush and brush shaft underwater comprises a motor fitted in a PVC casing, said casing being impervious to water, attached to the rectangular frame and a belt and gear assembly powered by the motor and attached to the brush shaft which rotates the brush shaft and brush.

3. The rotating brush assembly of claim 1 wherein the means for rotating the brush and brush shaft underwater comprises a fluid driven gear assembly fixed to the rectangular frame and powered by a pumping system located on a boat and a drive assembly located underwater connected to the fluid driven gear assembly and the brush shaft wherein the fluid driven gear assembly transfers seawater into the drive assembly thereby rotating the brush shaft and brush.

* * * * *